Oct. 17, 1961  L. SUDAKIN ET AL  3,004,454
FLY CUTTER
Filed July 18, 1957

INVENTORS
LEON SUDAKIN
JOHN D. LOY
BY
Hane and Nydick
ATTORNEYS

United States Patent Office

3,004,454
Patented Oct. 17, 1961

3,004,454
FLY CUTTER
Leon Sudakin, 84—30 126th St., Kew Gardens, N.Y., and John D. Loy, 1820 Avenue V, Brooklyn, N.Y.
Filed July 18, 1957, Ser. No. 672,745
5 Claims. (Cl. 77—69)

The present invention relates to circular cutters for use in making circular cuts in sheet or plate material, and more particularly this invention relates to circular fly cutters.

Fly cutters of the general kind above referred to comprise a central pivot shaft about which the cutting tool proper rotates, the diameter of the circular cut being determined by the radial distance between the pivot shaft and the cutting tool proper.

Various adjustment means have been proposed for varying this radial distance. However, the adjustment means as heretofore known, are complicated and expensive and especially not suitable for small scale production operations and home use.

Accordingly, one of the objects of the present invention is to provide a novel and improved hole cutting device of the general kind above referred to, which permits a simple and accurate adjustment of the diameter of the hole to be cut.

Another object of the present invention is to provide a novel and improved hole cutting device in which the radial spacing of the cutting tool from its rotational axis is variable within very accurate limits by the simple expedient of adjusting clamping screws engaging the cutting tool.

Still another object of the invention is to provide a novel and improved cutting device which requires a minimum number of components for holding and adjusting the cutting tool.

A further object of the invention is to provide a novel and improved cutting device which can be inexpensively manufactured and marketed.

A still further object of the invention is to provide a novel and improved cutting device which is designed to be powered by a readily available and widely used power tool such as a power drill.

Other and further objects, features and advantages of the invention will be pointed out hereinafter and set forth in the appended claims forming part of the application.

In the accompanying drawing a preferred embodiment of the invention is shown by way of illustration and not by way of limitation.

Figure 1:
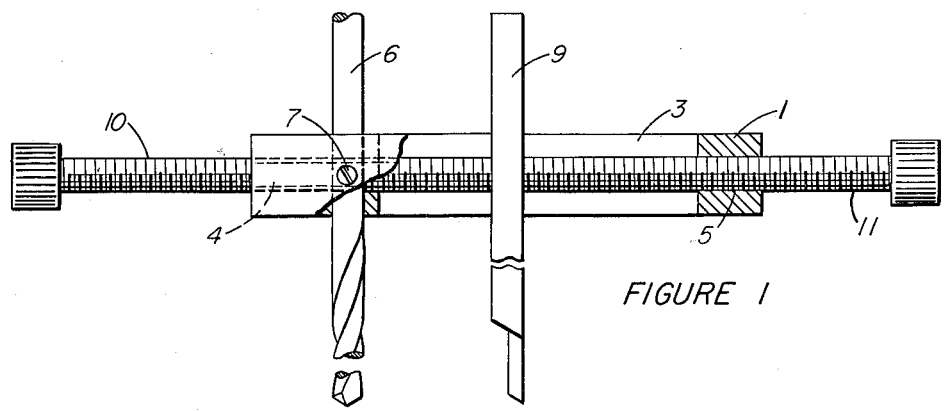
FIG. 1 is an elevational side view, partly in section, of an assembled cutting device according to the invention.

Referring now to the figures in detail, the cutting device according to the invention comprises a rigid elongated bar 1 made of suitable material such as metal or a hard plastic. Bar 1 is formed with a transverse hole 2 and a longitudinal slot 3 terminating short of both ends of bar 1. The hole and the slot extend through the same sides of bar 1. The slot communicates at both ends with threaded bores 4 and 5 respectively. Hole 2 serves to receive the pivot shaft 6 of the cutting device which is preferable in form of a drill bit designed to be received in the chuck of a power tool such as a power drill. The drill bit is axially displaceable in hole 2 and may be fixed in a selected position by means of a set screw 7 extending through a suitable threaded bore 8 in bar 1. The drill acts both, as a drill and as a centering point for the cutting device.

Slot 3 serves to receive the cutting tool 9 proper which is shown as a conventional cutting tool bit. The tool bit is fitted in slot 3 slideable along the length thereof and also transverse of bar 1. The position of the tool bit in slot 3 is fixed and controlled by two headed set screws 10 and 11 which are threaded into bores 4 and 5. The length of the screws in relation to the length of slot 3 is such that the tool bit can be tightly clamped between the inner ends of the screws in any selected position within slot 3 by simply adjusting the relative depth of insertion of the two screws. By selecting the fineness of the threads of screws 10 and 11 any desired precision of adjustment may be conveniently obtained. If desirable, screws 10 and 11 may be set up with a micrometer barrel of conventional design.

As is apparent, the positions of drill bit 6 and cutting bit 9 in relation to each other and to bar 1 are adjusted in accordance with the thickness of the material to be cut, the presence of recesses and similar conditions affecting the setting of the tool.

Figure 2:
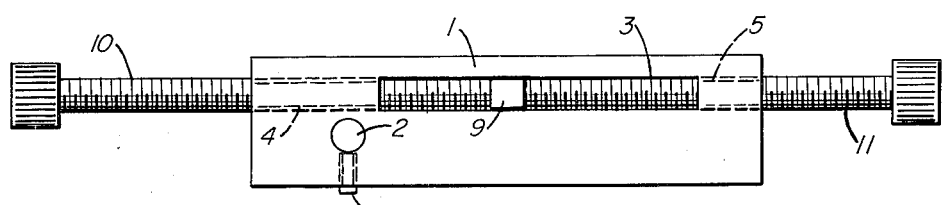
FIG. 2 is a plan view of FIG. 1.
Figure 3:
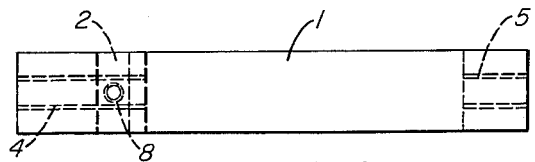
FIG. 3 is a detail view of a part of the cutting device shown in the same position as it is illustrated in FIG. 1.
Figure 4:
FIG. 4 is an insert piece for a cutting device.
Figure 5:
FIG. 5 is a side view of FIG. 4.

Cutting bit 9 is shown in FIGS. 1 and 2 in its middle position. If it be desired to reduce the diameter, screw 10 is partly withdrawn from and screw 11 is screwed deeper into the bar and vice versa. If the length of the bar should make the screws unwieldly, inserts fitting slot 3 may be provided. A suitable insert is shown in FIGS. 4 and 5 and designated by 12.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore to cover all such changes and modifications in the appended claims.

What is claimed as new and desired to be secured by Letters Patent is:

1. A fly cutter for cutting a circular hole in sheet material, said cutter comprising a rigid bar, a pivot and drive shaft fixedly mounted in said bar near one end thereof and transversely protruding from the bar for rotation of the bar jointly with the shaft about the shaft axis as rotational axis, said bar having a longitudinal slot terminating short of both ends of the bar and situated in a plane parallel to the axis of the pivot shaft, a cutting tool fitted in said slot slideable transverse of the slot and along the length thereof and transversely extending from the bar parallel to said pivot shaft, and a pair of setting means mounted on the bar at opposite ends of the slot, each setting means protruding through the bar into the respective end of the slot and being longitudinally adjustable in the slot independent of the other setting means for clamping the cutting tool within the slot between the setting means in a selected transverse lengthwise position within the slot.

2. A fly cutter for cutting a circular hole in sheet material, said cutter comprising a rigid bar, a pivot and drive shaft fixedly mounted in said bar near one end thereof and perpendicularly protruding from the bar for rotation of the bar jointly with the shaft about the shaft axis as rotational axis, said bar having a longitudinal slot terminating short of both ends of the bar and situated in a plane parallel to the axis of the pivot shaft, a cutting tool fitted in said slot slideable transverse of the slot and along the length thereof and transversely extending from the bar parallel to said pivot shaft, and a pair of screw means extending through opposite ends of the bar into the respective end of the slot and being therein longitudinally and independently adjustable for clamping the cutting tool between the facing ends of the two screw means in a selected transverse and lengthwise position within the slot.

3. A fly cutter for cutting a circular hole in sheet material, said cutter comprising a rigid bar, said bar having a transverse hole therethrough and a longitudinal slot transversely set off relative to the hole and terminating short of both ends of the bar, said hole and said slot being disposed in plane-parallel relationship, and a drive pivot shaft fixedly fittable in said hole and transversely extending from both sides of the bar, one end of the shaft being adapted to be received in a rotary drive means and the other constituting a centering point, said shaft and bar being jointly rotatable about the shaft axis as rotational axis, a cutting tool fitted in said slot slideable transverse of the slot and along the length thereof and transversely extending from the bar parallel to said pivot shaft, and a pair of setting means mounted on the bar at opposite ends of the slot, each setting means protruding into the respective end of the slot and being longitudinally adjustable independent of the other setting means for clamping the cutting tool between the two setting means in a selected transverse and lengthwise position within the slot.

4. A fly cutter according to claim 3, wherein said shaft is in the form of a drill bit, the respective end of the shaft being adapted to be received in a chuck.

5. A fly cutter for cutting a circular hole in sheet material, said cutter comprising a rigid bar, said bar having a transverse hole therethrough and a longitudinal slot transversely set off relative to the hole and terminating short of both ends of the bar, said hole and said slot being disposed in plane-parallel relationship, a pivot and drive shaft slideably fitted in said hole and transversely extending from both sides of the bar parallel to the shaft, means for releasably securing the shaft in a selected transverse position relative to the bar, one end of the shaft being adapted to be received in a drive means and the other constituting a centering point, said shaft and bar being jointly rotatable about the shaft axis, a cutting tool fitted in said slot slideable transverse of the slot and along the length thereof and transversely extending from the bar parallel to said pivot shaft, and a pair of setting means each mounted on the bar at opposite ends of the slot, each setting means protruding into the respective end of the slot and being longitudinally adjustable independent of the other setting means for clamping the cutting tool between the two setting means in a selected lengthwise and transverse position within the slot.

References Cited in the file of this patent

UNITED STATES PATENTS

| | | |
|---|---|---|
| 1,280,746 | Jakubec | Oct. 8, 1918 |
| 2,311,234 | Krajuc | Feb. 16, 1943 |
| 2,368,908 | Witter et al. | Feb. 6, 1945 |
| 2,429,382 | Wilson | Oct. 21, 1947 |
| 2,693,853 | Bushnell | Nov. 9, 1954 |

FOREIGN PATENTS

| | | |
|---|---|---|
| 116,118 | Germany | Dec. 28, 1900 |
| 272,041 | Great Britain | June 9, 1927 |